F. TEETER.
HOSE CLAMP.
APPLICATION FILED MAY 15, 1911.

1,133,195.

Patented Mar. 23, 1915.

Witnesses
C. B. Hibbard
R. L. Williams

Inventor
Fred Teeter
By Ithiel J. Cilley
Attorney

UNITED STATES PATENT OFFICE.

FRED TEETER, OF BATTLE CREEK, MICHIGAN.

HOSE-CLAMP.

1,133,195.        Specification of Letters Patent.      Patented Mar. 23, 1915.

Application filed May 15, 1911. Serial No. 627,353.

*To all whom it may concern:*

Be it known that I, FRED TEETER, a citizen of the United States, residing at Battle Creek, in the county of Calhoun and State of Michigan, have invented certain new and useful Improvements in Hose-Clamps, of which the following is a specification.

My invention relates to improvements in clamps for mending and securing garden or sprinkling hose, and its objects are: First, to provide a clamp with which a practically uniform and firm bearing may be made around the entire surface of the hose being clamped. Second, to provide a hose clamp that may be firmly clamped around the hose without danger of breaking the ears at the bend close to the hose. I attain these objects by the construction shown in the accompanying drawing in which—

Figure 1:
Figure 2:
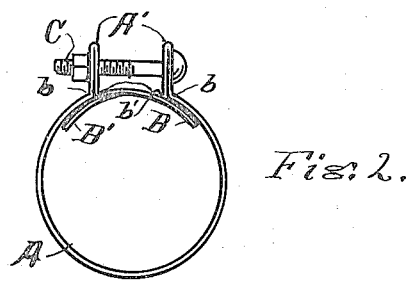
Figure 3:
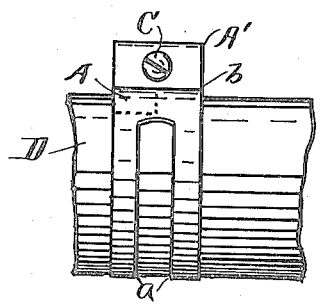

Figure 1 is a plan of the blank from which the clamp is made. Fig. 2 is an edge or end elevation of a completed clamp, and Fig. 3 is a side elevation of a clamp showing how it may be applied to a hose.

Similar letters refer to similar parts through the several views.

In the construction of these clamps I first form a blank, practically as shown in Fig. 1, having a body A, which has a slot $a$ formed longitudinally of it so that the material at each side of this slot will be narrow enough to be easily pressed into the surface of the hose when the bolt C is drawn firmly to place in the ears A'. One half of the width of the blank is cut away at each end to form the overlapping extensions B B', shown in Fig. 1 and plainly indicated in Fig. 2; and there are two holes punched through each end, as at $a'$ $a'$, that are designed to register when the clamp is formed to form a passage way for the bolt C, as indicated in Fig. 2.

To complete the clamp the blank is bent upward upon the lines $x''$ $x''$ to form the bends $b$ $b$ between the body A and the ears A'. It is then bent downward on the lines $x$ $x$ to form double thickness of metal at the ears, and the ends B B' are bent outward on the lines $x'$ $x'$ to form the shoulders or bends $b'$ and the overlapping ends B B', as hereinbefore stated, and as shown in Fig. 2 and indicated by the dotted lines in Fig. 3.

It will be readily understood that as the ends B B' lap by each other, each forming one half of the width of the clamp, the shoulders formed at the bend $b'$ will rest, at each side of the opening between the ears, upon the upper surfaces of the ends B B' and, as these ends are supported by the surface of the hose D, will greatly add to the resisting properties of the ears A', while the overlapping of the ends B B' will carry the extreme ends of these parts well back under the surface of the body A, beyond the shoulders formed by the bends $b$ $b$, will form a continuous annular bearing of the clamp around the entire hose so that a firm, continuous and unbroken bearing is formed over its entire bearing surface around the hose, and so that the bearing upon the nozzle, or any other object to which the hose is to be secured will be so firmly and uniformly clamped as to wholly avert any danger of water escaping between the base of the ears A', as often occurs where no support is provided for at this point.

What I claim as new, and desire to secure by Letters Patent of the United States, is:

1. A hose clamp comprising a body and an outwardly projecting ear, and a forwardly projecting joint tongue at each end of said body, formed integrally of thin sheet metal, said ears being formed by outward folds in said body and being perforated to receive a clamping bolt, said tongues being diagonally opposed extensions of the ends of the body and adapted to coöperate to form a continuous bearing extending beyond the ears and between the surfaces of the clamp and the hose, and from edge to edge of the clamp.

2. In combination with a garden hose, a hose clamp made from a single sheet metal blank having one half of each end cut away to form overlapping ends, the blank bent to form ears having two thicknesses of metal in each, and the ends extended to lap by each other and well back between the body of the clamp and the surface of the hose, to form a continuous bearing around a hose and rigid braces for the ears, said ears provided with holes, and a bolt passed through said holes and firmly screwed to place.

3. In a hose clamp, a body made from a single sheet of metal having a longitudinal slot and bolt holes, the ends of the blank cut to form one half the width of the blank, each end of the blank bent between the holes and at each side thereof to form ears with the reduced ends lapping by each other and well under the body of the blank to firmly brace the ears and form a continuous uniform bearing entirely around a hose to which it may be applied, and a securing bolt passed through the ears.

4. A hose clamp comprising a body and an outwardly projecting ear and a forwardly projecting joint tongue at each end of said body formed integrally of sheet metal, said ears being formed by outward folds in said body and being perforated to receive a clamping bolt, said tongues being diagonally opposed extensions of the ends of the body and adapted to coöperate to form a continuous bearing extending between the ears and from edge to edge of the clamp.

5. In a hose clamp, a body made from a single sheet of metal having bolt holes, the ends of the blank cut to form one half of the width of the blank, each end of the blank bent between the holes and at each side thereof to form ears with the reduced ends lapping by each other and well under the body of the blank to firmly brace the ears and form a continuous uniform bearing entirely around a hose to which it may be applied, and a securing bolt passed through the ears.

Signed at Grand Rapids Michigan April 29th 1911.

FRED TEETER.

In presence of—
 ARTHUR C. COLVIN,
 H. A. ROWLES.